US012608951B2

(12) United States Patent (10) Patent No.: US 12,608,951 B2

Kanzawa (45) Date of Patent: Apr. 21, 2026

(54) METHOD AND SYSTEM FOR GENERATING GROUND TRUTH DATA FOR MACHINE LEARNING OF RECOGNIZER

(71) Applicant: TOYOTA JIDOSHA KABUSHIKI KAISHA, Toyota (JP)

(72) Inventor: Yusuke Kanzawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 396 days.

(21) Appl. No.: 18/336,087

(22) Filed: Jun. 16, 2023

(65) Prior Publication Data

US 2023/0410534 A1 Dec. 21, 2023

(30) Foreign Application Priority Data

Jun. 20, 2022 (JP) ................................. 2022-099089

(51) Int. Cl.
*G06V 20/58* (2022.01)
*G06T 7/12* (2017.01)
(Continued)

(52) U.S. Cl.
CPC ................ *G06V 20/58* (2022.01); *G06T 7/12* (2017.01); *G06T 7/564* (2017.01); *G06V 10/764* (2022.01);
(Continued)

(58) Field of Classification Search
None
See application file for complete search history.

(56) References Cited

U.S. PATENT DOCUMENTS

2019/0370606 A1* 12/2019 Kehl ....................... G06V 10/82
2020/0066036 A1* 2/2020 Choi ....................... G06N 3/084
(Continued)

FOREIGN PATENT DOCUMENTS

JP 2017102838 A 6/2017
JP 2020144755 A 9/2020
JP 2022-013838 A 1/2022

OTHER PUBLICATIONS

Ozaki, Nobuyuki, "On-Vehicle Image Recognition Technology," Journal of Video Information Media, General Incorporated Video Information Media Society, 2019, vol. 73, No. 6, pp. 1060-1066, Japan (with English translation of Office Action issued on Dec. 17, 2024 in corresponding Japanese Patent Appl No. 2022-099089 for relevance).

(Continued)

*Primary Examiner* — Leon Viet Q Nguyen
(74) *Attorney, Agent, or Firm* — Dinsmore & Shohl LLP

(57) ABSTRACT

According to the present method, first, first surrounding environment data is acquired by a first sensor. Next, second surrounding environment data is acquired by a second sensor at a same time as an acquisition time of the first surrounding environment data in a same region as an acquisition region of the first surrounding environment data. Next, first recognition result is acquired by inputting the first surrounding environment data into a first recognizer machine-learned using surrounding environment data acquired by the first sensor. Next, the first recognition result is projected onto the second surrounding environment data by transformation from a coordinate system of the first sensor to a coordinate system of the second sensor. Then, ground truth data for machine-learning a second recognizer configured to recognize surrounding environment data acquired by the second sensor is generated based on the (Continued)

second surrounding environment data onto which the first recognition result is projected.

4 Claims, 16 Drawing Sheets

(51) Int. Cl.
| | |
|---|---|
| *G06T 7/564* | (2017.01) |
| *G06V 10/764* | (2022.01) |
| *G06V 10/774* | (2022.01) |
| *G06V 20/70* | (2022.01) |

(52) U.S. Cl.
CPC ............ *G06V 10/774* (2022.01); *G06V 20/70* (2022.01); *G06T 2207/10028* (2013.01); *G06T 2207/20021* (2013.01); *G06T 2207/20081* (2013.01); *G06T 2207/30252* (2013.01)

(56) References Cited

U.S. PATENT DOCUMENTS

| | | | |
|---|---|---|---|
| 2021/0405185 A1 | 12/2021 | Price et al. | |
| 2022/0129704 A1 | 4/2022 | Murata | |
| 2022/0335647 A1* | 10/2022 | Shrivastava | ........... G06V 10/82 |
| 2024/0071060 A1* | 2/2024 | Barker | ............... G06V 10/7788 |

OTHER PUBLICATIONS

Steinemann et al., "3D Outline Contours of Vehicles in 3D-LIDAR-Measurements for Tracking Extended Targets," IEEE Intelligent Vehicles Symposium, IEEE, pp. 432-437, 2012, U.S.

* cited by examiner

METHOD AND SYSTEM FOR GENERATING GROUND TRUTH DATA FOR MACHINE LEARNING OF RECOGNIZER

CROSS-REFERENCE TO RELATED APPLICATION

The present application claims priority under 35 U.S.C. § 119 to Japanese Patent Application No. 2022-099089, filed Jun. 20, 2022, the contents of which application are incorporated herein by reference in their entirety.

BACKGROUND

Field

The present disclosure relates to a method and system for generating ground truth data for machine learning of a recognizer.

Background Art

The prior art disclosed in JP2017-102838A relates to a system for constructing a database for machine learning. In this prior art, partial point cloud is projected onto a camera image so that the coordinates of the space in which the image of a recognition target in the camera image exists and the coordinates of the space in which the data of the partial point cloud is represented are consistent with each other. Then, a partial point cloud in which the ratio of the number of points included in the range of the image of the recognition target in the camera image is equal to or greater than a threshold value is associated as the recognition target and stored in a database as supervised learning data for machine learning.

In addition to JP2017-102838A, JP2020-144755A can be exemplified as a document showing the technical level of the technical field related to the present disclosure.

SUMMARY

In order to improve the performance of a recognizer for a sensor of an autonomous driving vehicle, it is necessary to repeat machine learning. Although ground truth data should be prepared for machine learning, annotation on data acquired by the sensor is required in order to create ground truth data. In addition, there is a case where the sensor configuration is updated such as replacement or new installation of the sensor, and it is necessary to re-collect a large amount of data and perform annotation again every time the sensor configuration is updated. However, there is a problem in that the annotation is generally performed manually and takes time and cost.

The present disclosure has been made in view of the above-described problem, and an object thereof is to provide a technique capable of easily generating ground truth data for machine learning of a recognizer by automatically performing annotation.

The present disclosure provides a method for achieving the above object. The method of the present disclosure is a method for generating ground truth data for machine learning of a recognizer. In the method of the present disclosure, first surrounding environment data is acquired by a first sensor, and second surrounding environment data is acquired by a second sensor at the same time as an acquisition time of the first surrounding environment data and in the same region as an acquisition region of the first surrounding environment data. The first surrounding environment data is input into a first recognizer to acquire a first recognition result. The first recognizer performs machine learning using the surrounding environment data acquired by the first sensor. The acquired first recognition result is projected onto the second surrounding environment data by transformation from the coordinate system of the first sensor into the coordinate system of the second sensor. In other words, annotation is performed on the second surrounding environment data. Then, based on the second surrounding environment data onto which the first recognition result is projected, ground truth data for machine learning of a second recognizer configured to recognize surrounding environment data acquired by the second sensor is generated.

According to the method of the present disclosure, it is possible to automatically perform annotation on the second surrounding environment data acquired by the second sensor by using the first recognition result acquired by the already machine-learned first recognizer for the first sensor. Accordingly, it is possible to easily generate ground truth data for machine learning of the second recognizer for the second sensor.

In the method of the present disclosure, the second sensor may be a sensor having a different modality than the first sensor. According to this, it is possible to improve the performance of a recognizer for a sensor having a certain modality by using the recognition result of a sensor having a different modality. The autonomous driving vehicle may be provided with a plurality of sensors having different modalities, such as a camera, a LiDAR, and a radar.

In the method of the present disclosure, the first recognizer and the second recognizer may be configured as object detectors. Also, the first recognition result may be represented by a bounding box. When the first recognizer is an object detector and the first recognition result is represented by a bounding box, the bounding box is projected onto the second surrounding environment data acquired by the second sensor. Since the second recognizer is also an object detector, the learning efficiency of machine learning is improved by using the second surrounding environment data onto which the bounding box is projected as ground truth data.

In the method of the present disclosure, the second surrounding environment data may be input into a third recognizer to acquire a second recognition result. The third recognizer has already machine-learned using surrounding environment data acquired by the second sensor. The acquired second recognition result may be projected onto the second surrounding environment data onto which the first recognition result is projected. In this case, the ground truth data is generated based on the second surrounding environment data on which the first recognition result and the second recognition result are projected. By projecting the second recognition result by the third recognizer onto the second surrounding environment data, the accuracy of the annotation can be improved.

In the method of the present disclosure, the second sensor may be a camera, the third recognizer may be an image classifier configured to perform semantic segmentation, and the second recognition result may be represented by per-pixel classification information. By projecting the output result of the image classifier onto the second surrounding environment data, the accuracy of the annotation can be improved.

In the method of the present disclosure, when the first sensor is a LiDAR, the first surrounding environment data may be input into a velocity estimator configured to estimate velocity of point cloud data acquired by the first sensor, thereby acquiring a velocity estimation result. The acquired velocity estimation result may be projected onto the second surrounding environment data onto which the first recognition result is projected. In this case, the ground truth data is generated based on the second surrounding environment data onto which the first recognition result and the velocity estimation result are projected. By projecting the output result of the velocity estimator onto the second surrounding environment data, the accuracy of the annotation can be improved.

In the method of the present disclosure, when the first sensor is a LiDAR, the contour shape of an object may be extracted from point cloud data acquired by the first sensor. The extracted contour shape may be projected onto the second surrounding environment data onto which the first recognition result is projected. By projecting the contour shape of the object extracted from the point cloud data onto the second surrounding environment data, the accuracy of the annotation can be improved. In this case, the ground truth data is generated based on the second surrounding environment data onto which the first recognition result and the contour shape are projected.

The present disclosure provides a system for achieving the above object. The system of the present disclosure comprises a first storage device configured to store first surrounding environment data acquired by a first sensor and a second storage device configured to store second surrounding environment data acquired by a second sensor. The second surrounding environment data is surrounding environment data acquired at the same time as an acquisition time of the first surrounding environment data and in the same region as an acquisition region of the first surrounding environment data. The second sensor may be a sensor having a different modality than the first sensor. The first storage device and the second storage device may be different hardware, or may be different storage areas of the same hardware.

The system of the present disclosure comprises at least one processor and a program memory coupled to the at least one processor and storing a plurality of executable instructions. The plurality of executable instructions is configured to cause the at least one processor to read the first environmental data from the first storage device and to input the first environmental data into a first recognizer to acquire a first recognition result. The first recognizer performs machine learning using the surrounding environment data acquired by the first sensor. Furthermore, the plurality of executable instructions is configured to cause the at least one processor to project the first recognition result into the second surrounding environment data by transformation from the coordinate system of the first sensor into the coordinate system of the second sensor. Further, the plurality of executable instructions is configured to cause the at least one processor to generate ground truth data for machine learning of a second recognizer configured to recognize surrounding environment data acquired by the second sensor, based on second surrounding environment data on which the first recognition result is projected.

According to the system of the present disclosure, it is possible to automatically perform annotation on the second surrounding environment data acquired by the second sensor using the first recognition result acquired by the already machine-learned first recognizer for the first sensor. Accordingly, it is possible to easily generate ground truth data for machine learning of the second recognizer for the second sensor.

As described above, according to the method and system of the present disclosure, it is possible to easily generate ground truth data for machine learning of a recognizer by automatically performing annotation.

BRIEF DESCRIPTION OF THE DRAWINGS

FIG. 4 is a schematic diagram showing automatic annotation processing of the first specific example.

FIG. 12 is a schematic diagram showing automatic annotation processing according to the fifth specific example.

DETAILED DESCRIPTION

1. First Embodiment

1-1. Overview of First Embodiment

Figure 1:
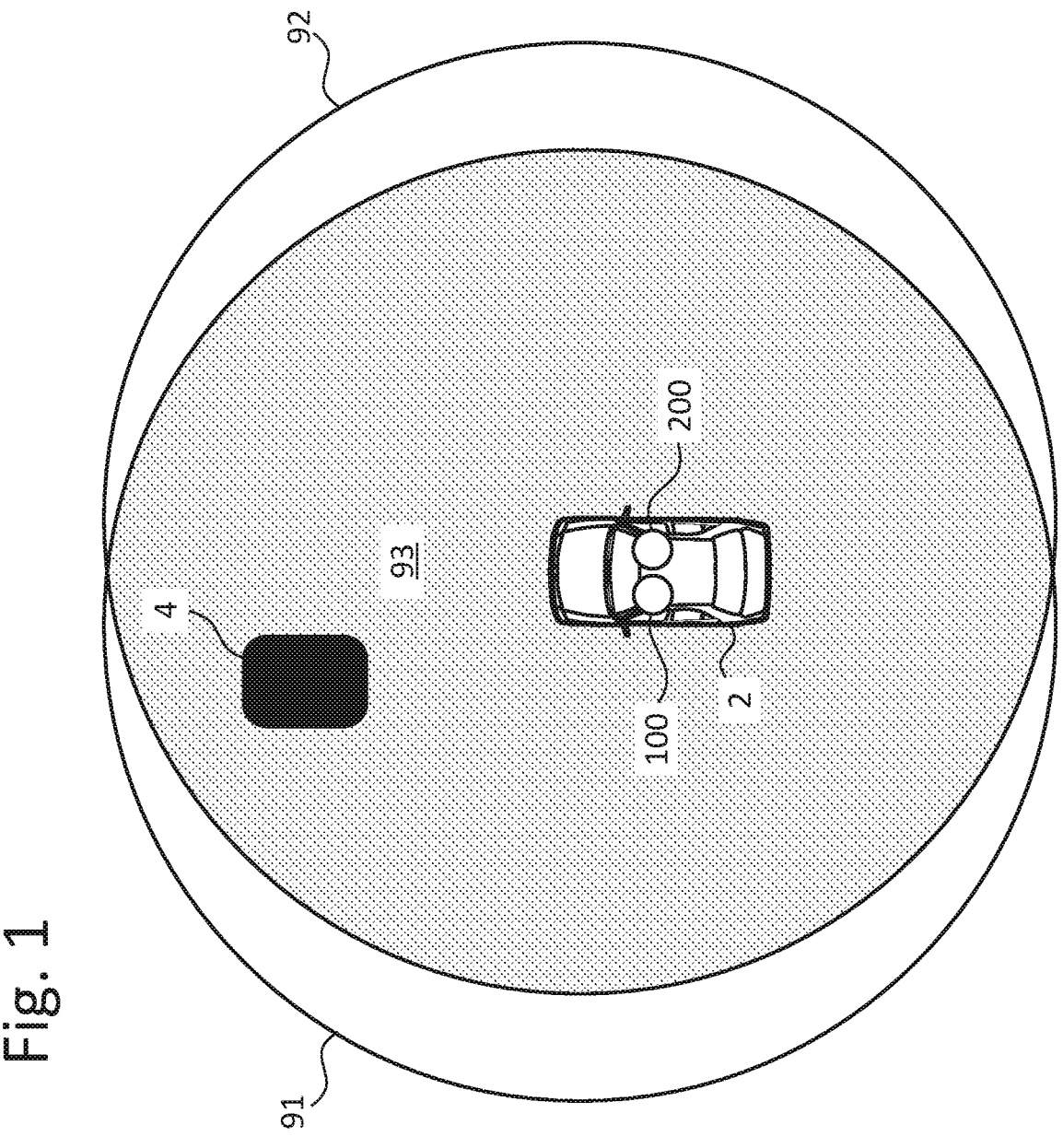
FIG. 1 is a diagram illustrating an outline of a first embodiment of the present disclosure.

FIG. 1 is a diagram illustrating an outline of a first embodiment of the present disclosure. A vehicle 2 illustrated in FIG. 1 is an autonomous driving vehicle that recognizes a surrounding environment from surrounding environment data acquired by an external sensor and autonomously travels based on a recognition result. Two external sensors, a first sensor 100 and a second sensor 200, are mounted on the vehicle 2. A first recognizer is provided for the first sensor 100, and a second recognizer is provided for the second sensor 200. Each recognizer is configured as an application of an in-vehicle computer, for example.

Here, a case where the second sensor 200 is replaced with a new sensor will be considered. The new sensor includes, for example, a sensor of a different type, a sensor of the same type manufactured by a different manufacturer, and a sensor of the same type manufactured by the same manufacturer and having a different model number. In a case where the second sensor 200 is replaced with such a new sensor, the second recognizer machine-learned using the output of the sensor before the replacement cannot support the new sensor. In this case, it is necessary to newly perform machine learning of the second recognizer so as to correspond to the replaced new second sensor 200.

Machine learning of the second recognizer requires ground truth data for generating a training data set and a test data set. In order to create the ground truth data, it is necessary to perform annotation, that is, tagging of features included in the data acquired by the second sensor 200. The method according to the first embodiment is also a method for automatically performing the tagging operation. In the method according to the first embodiment, the surrounding environment data acquired by the existing first sensor 100 is used for annotation.

As shown in FIG. 1, there is an overlap region 93 between a region 91 recognized by the first sensor 100 and a region 92 recognized by the second sensor 200. A moving object 4 present in the overlap region 93 is included in surrounding environment data (first surrounding environment data) acquired by the first sensor 100 and is also included in surrounding environment data (second surrounding environment data) acquired by the second sensor 200.

By replacing the second sensor 200, machine learning of the second recognizer is required, but the first recognizer corresponding to the first sensor 100 is functioning. By inputting the first surrounding environment data acquired by the first sensor 100 into the first recognizer, a recognition result (first recognition result) by the first sensor 100 is acquired. Since the first surrounding environment data and the second surrounding environment data are data acquired in the same region at the same time, if the moving object 4 is included in the first recognition result, the data of the moving object 4 is also included in the second surrounding environment data.

The first surrounding environment data including the first recognition result is data represented by the coordinate system of the first sensor 100, and the second surrounding environment data is data represented by the coordinate system of the second sensor 200. There is a difference between the coordinate system of the first sensor 100 and the coordinate system of the second sensor 200 due to the difference in the type of the sensor and the mounting position and the mounting posture of the sensor on the vehicle 2. In the method according to the first embodiment, the first recognition result is projected onto the second surrounding environment data by transformation from the coordinate system of the first sensor 100 to the coordinate system of the second sensor 200. In order to correctly transform the coordinate system, calibration is performed in advance between the first sensor 100 and the second sensor 200.

By projecting the first recognition result onto the second surrounding environment data, the first recognition result is superimposed on the features of the second surrounding environment data. As a result, which feature of the second surrounding environment data corresponds to the moving object 4 is determined. The annotation using the first recognition result is also performed on other features included in the second surrounding environment data, thereby generating ground truth data for the second surrounding environment data.

1-2. System According to First Embodiment

Figure 2:
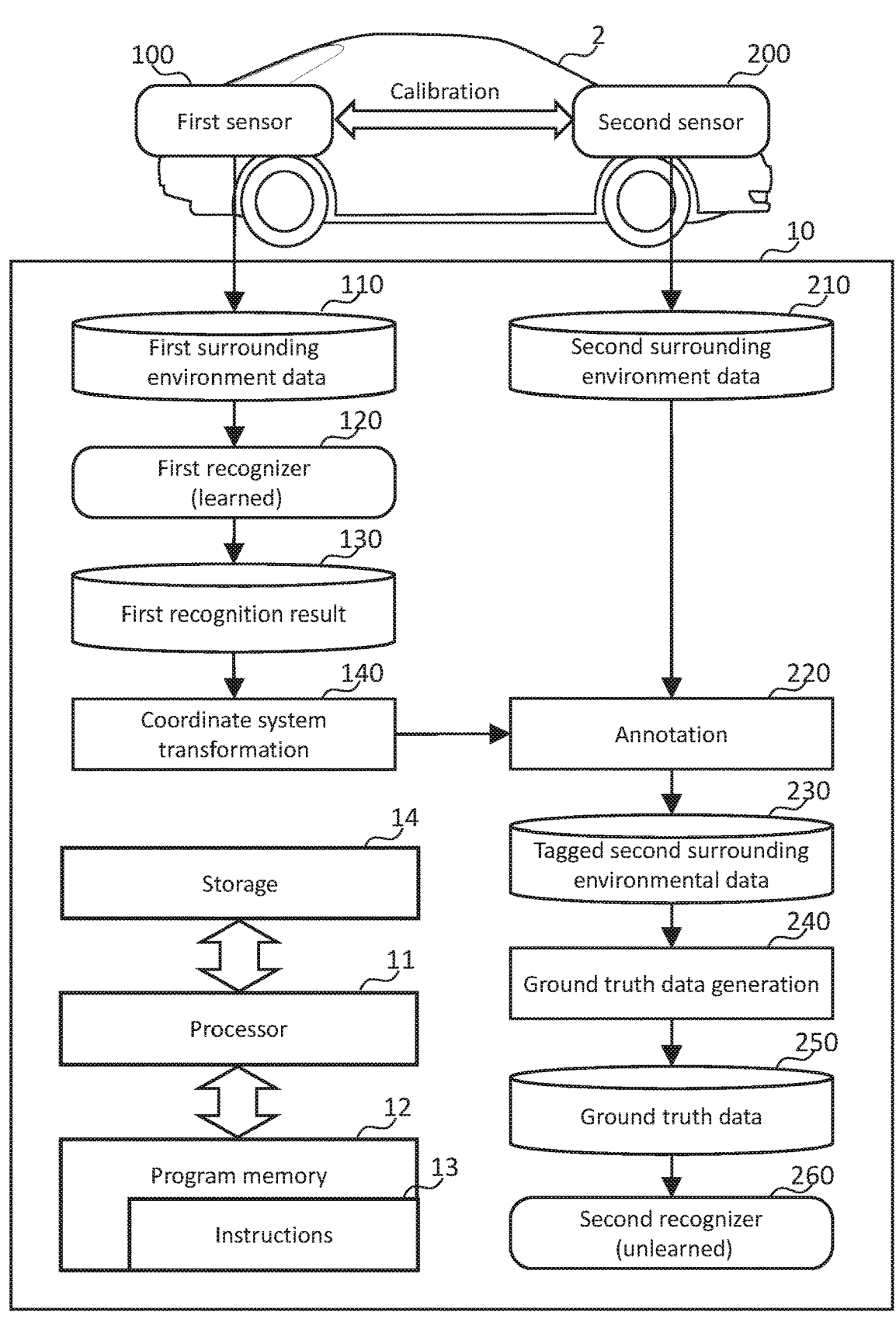
FIG. 2 is a diagram illustrating a configuration of a system according to the first embodiment of the present disclosure.

FIG. 2 is a diagram illustrating a configuration of a system according to the first embodiment. The system 10 according to the first embodiment is a system that generates ground truth data for machine learning of a recognizer of the second sensor 200 using outputs of the existing first sensor 100. The relative positions and relative postures of the first sensor 100 and the second sensor 200 are calibrated in advance in a state where the first sensor 100 and the second sensor 200 are mounted on the vehicle 2. If the mounting positions and postures of the first sensor 100 and the second sensor 200 are the same as those of the actual autonomous driving vehicle, the vehicle 2 used for generation of the ground truth data may not necessarily be the autonomous driving vehicle.

The system 10 includes a storage device (first storage device) 110 that stores the first surrounding environment data acquired by the first sensor 100. A time code indicating an acquisition time by the first sensor 100 is attached to the first surrounding environment data. In addition, the system 10 includes a storage device (second storage device) 210 that stores the second surrounding environment data acquired by the second sensor 200. A time code indicating an acquisition time by the second sensor 200 is attached to the second surrounding environment data. The first surrounding environment data and the second surrounding environment data may be data acquired when the vehicle 2 travels in a town, or may be data acquired in a state where the vehicle 2 is stopped near a road with a large amount of traffic, for example.

The system 10 comprises a first recognizer 120. The first recognizer 120 is a learned recognizer that is machine-learned using the surrounding environment data acquired by the first sensor 100. The first surrounding environment data stored in the storage device 110 is input into the first recognizer 120. The first recognizer 120 outputs a first recognition result acquired by recognition processing on the first surrounding environment data. The first recognition result is stored in the storage device 130.

The system 10 includes a coordinate transformer 140. The coordinate transformer 140 is configured to transform data from the coordinate system of the first sensor 100 to the coordinate system of the second sensor 200. The first recognition result stored in the storage device 130 is data represented by the coordinate system of the first sensor 100. The first recognition result is input into the coordinate transformer 140, and transformed from the coordinate system of the first sensor 100 to the coordinate system of the second sensor 200. The result of calibration between the first sensor 100 and the second sensor 200 is used for the transformation of the coordinate system.

The system 10 includes an annotator 220 that automatically performs annotation. The annotator 220 reads the second surrounding environment data from the storage device 210, and projects the first recognition result transformed into the coordinate system of the second sensor 200 onto the second surrounding environment data. The annotator 220 performed annotation while matching the time code of the second surrounding environment data which is the projection destination with the time code of the first recognition result which is the projection target. The annotator 220 outputs tagged second surrounding environment data acquired by the annotation. The tagged second surrounding environmental data is stored in the storage device 230.

The system 10 comprises a ground truth data generator 240. The ground truth data generator 240 generates ground truth data for machine learning of a second recognizer 260 based on the tagged second surrounding environment data. For example, the ground truth data is generated by changing the data format of the tagged second surrounding environment data to that for machine learning. Further, generating the ground truth data includes using the tagged second surrounding environment data as it is as the ground truth data. The ground truth data is stored in a storage device 250 in preparation for machine learning of the second recognizer 260.

The system 10 can be composed of one computer or a plurality of computers arranged on a network. The system 10 includes a processor 11, a program memory 12, and a storage device 14 as hardware. The processor 11 is coupled to the program memory 12 and the storage device 14 by an internal bus of a computer or a network between computers.

The program memory 12 is a non-transitory memory that stores executable instructions 13. The instructions 13 constitute a program for implementing the method according to the first embodiment. The instructions 13 are executed by the processor 11 to cause the processor 11 to function as the first recognizer 120, the coordinate transformer 140, the annotator 220, and the ground truth data generator 240.

The storage device 14 is, for example, a flash memory, an SSD, or an HDD. Areas corresponding to the storage devices 110, 130, 210, 230, and 250 may be secured in one storage device 14, or each of the storage devices 110, 130, 210, 230, and 250 may be an independent storage device 14.

1-2-1. First Specific Example

Hereinafter, a specific example of the system 10 according to the first embodiment will be described.

Figure 3:
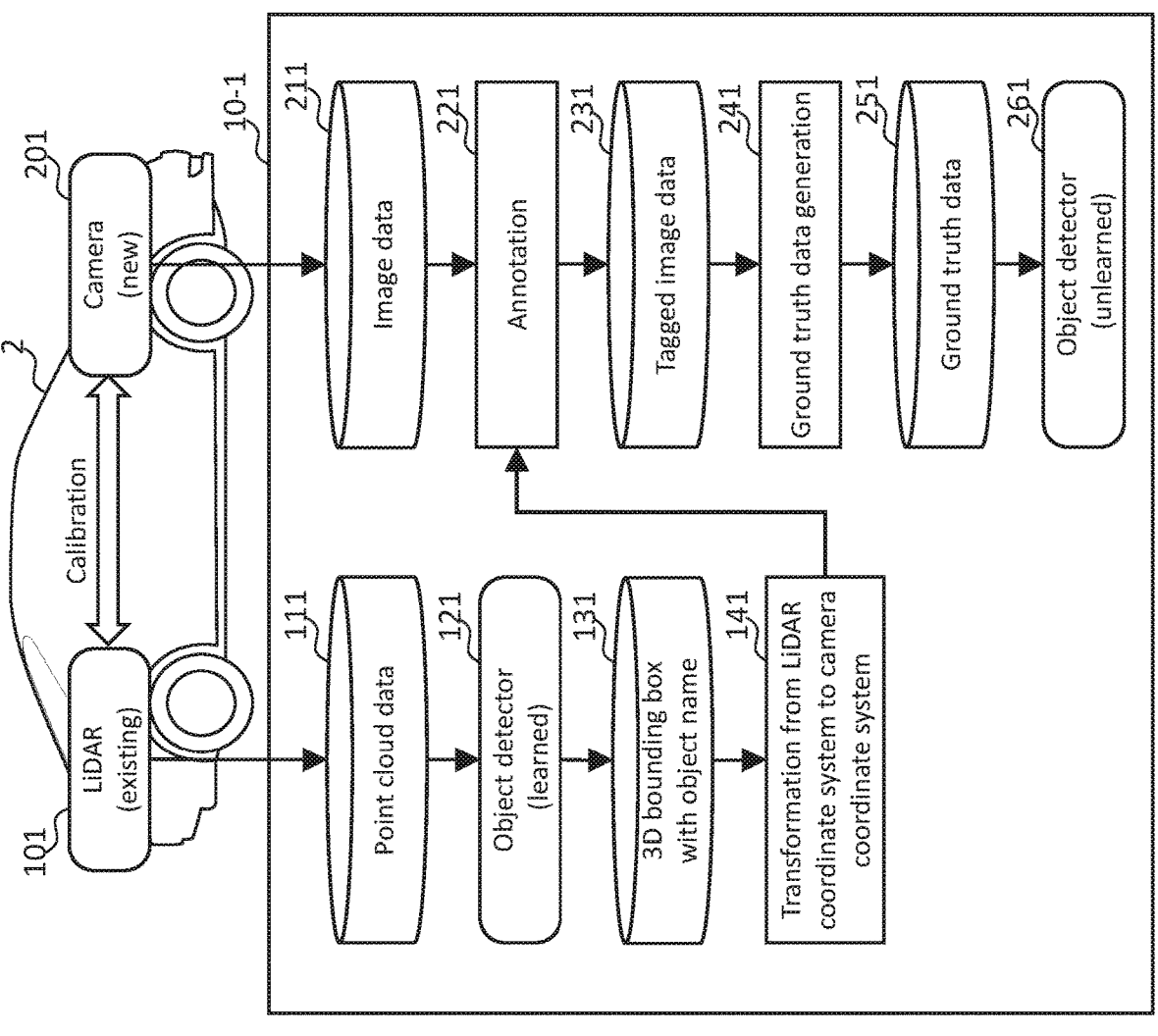
FIG. 3 is a diagram illustrating a first specific example of the system according to the first embodiment of the present disclosure.

FIG. 3 illustrates a system 10-1 as the first specific example. In the first specific example, the existing first sensor is a LiDAR 101 and the new second sensor is a camera 201. The camera 201 is a sensor having a modality different from that of the LiDAR 101.

In the first specific example, point cloud data is acquired by the LiDAR 101 as the first surrounding environment data. The point cloud data acquired by the LiDAR 101 is stored in a storage device 111. As the second surrounding environment data, image data is acquired by the camera 201. The image data acquired by the camera 201 is stored in a storage device 211.

The system 10-1 comprises an object detector 121. The object detector 121 is a recognizer (first recognizer) using a deep learning model that is machine-learned to recognize a moving object from point cloud data acquired by the LiDAR 101. The point cloud data stored in the storage device 111 is input into the object detector 121. The object detector 121 outputs a recognition result acquired by recognition processing on the point cloud data. The recognition result includes a three-dimensional bounding box indicating the size of the recognized moving object and the object name of the recognized moving object. The recognized three-dimensional bounding box and the object name are stored in a storage device 131.

In the system 10-1, a coordinate transformer 141 is configured to transform data from the three-dimensional coordinate system of the LiDAR 101 to the two-dimensional coordinate system of the camera 201. The three-dimensional bounding box is input into the coordinate transformer 141 and transformed into a two-dimensional bounding box. The result of calibration between the LiDAR 101 and the camera 201 is used for transformation of the coordinate system.

In the system 10-1, an annotator 221 reads image data from the storage device 211 and projects the two-dimensional bounding box and the object name acquired by the coordinate transformer 141 onto the image data. The annotator 221 performs annotation while matching the time code of the image data which is the projection destination with the time code of the data to be projected. The annotator 221 outputs tagged image data acquired by the annotation. The tagged image data is stored in a storage device 231.

A ground truth data generator 241 generates ground truth data for machine learning of an object detector 261 based on the tagged image data. The object detector 261 is a recognizer (second recognizer) using a deep learning model. The object detector 261 is machine-learned to recognize a moving object from the image data acquired by the camera 201. The ground truth data is stored in a storage device 251 in preparation for machine learning of the object detector 261.

Figure 4:
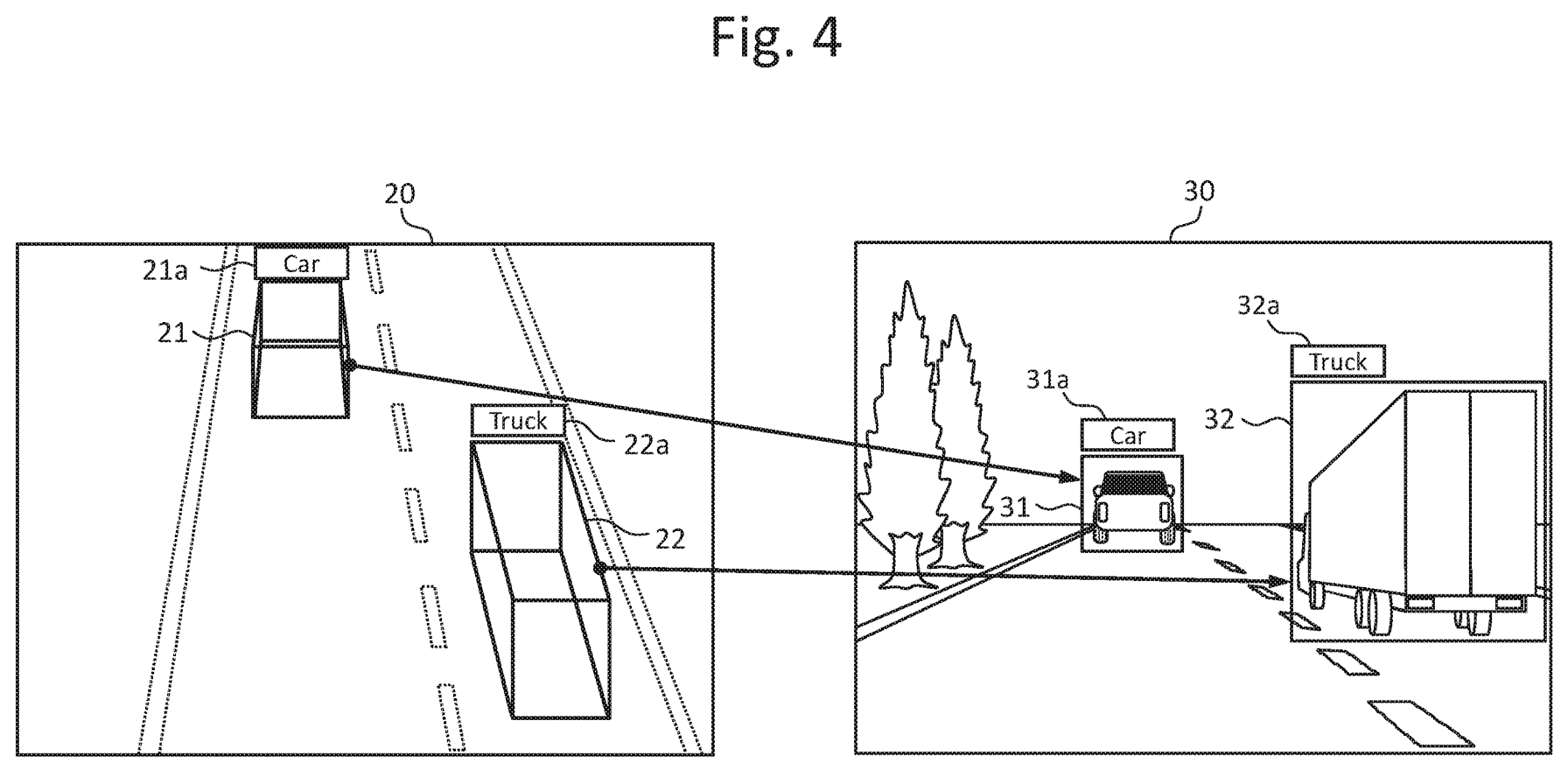

Here, automatic annotation processing by the system 10-1 will be specifically described with reference to FIG. 4. When point cloud data 20 acquired by the LiDAR 101 is input into the object detector 121, a moving object included in the point cloud data 20 is represented by three-dimensional bounding boxes 21 and 22. Tags 21a and 22a indicating object names are attached to the three-dimensional bounding boxes 21 and 22, respectively. In the example shown in FIG. 4, the three-dimensional bounding box 21 represents a car and the three-dimensional bounding box 22 represents a truck.

The three-dimensional bounding boxes 21 and 22 are transformed into two-dimensional bounding boxes 31 and 32 by the coordinate transformer 141. The two-dimensional bounding boxes 31 and 32 are projected onto image data 30 acquired by the camera 201 together with the tags 31a and 32a indicating the object names. As a result, the car image is surrounded by the two-dimensional bounding box 31 and tagged with the tag 31a, and the truck image is surrounded by the two-dimensional bounding box 32 and tagged with the tag 32a.

As described above, according to the system 10-1, it is possible to automatically perform annotation on the image data 30 acquired by the new camera 201 using the recognition result acquired by the existing object detector 121 for the LiDAR 101. Accordingly, it is possible to easily generate the ground truth data for machine learning of the object detector 261 for the camera 201.

1-2-2. Second Specific Example

Figure 5:
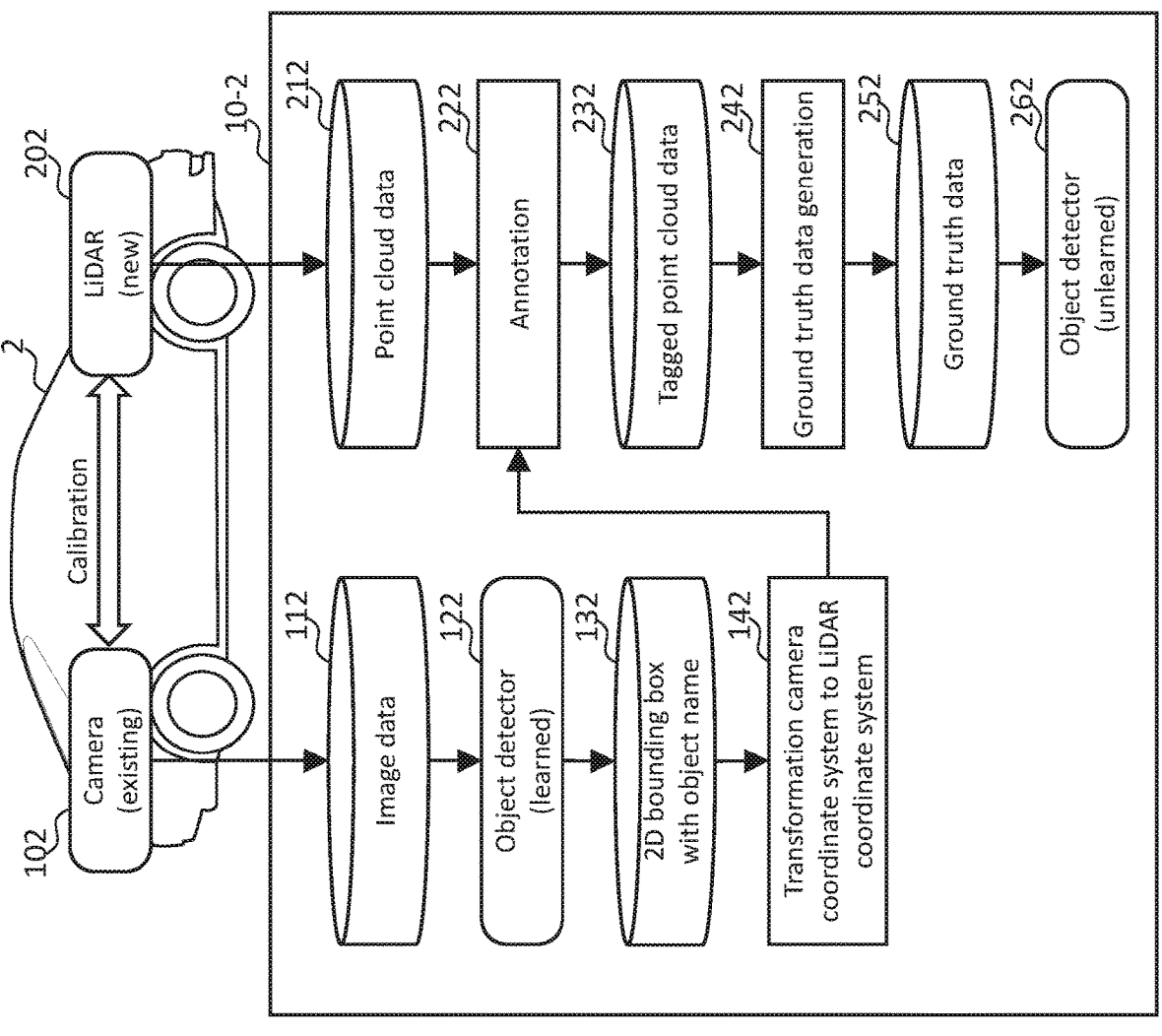
FIG. 5 is a diagram illustrating a second specific example of the system according to the first embodiment of the present disclosure.

FIG. 5 illustrates a system 10-2 as the second specific example. Similarly to the first specific example, the second specific example is also an example in which the performance of a recognizer for a sensor having a certain modality is improved by using the recognition result of a sensor having a different modality. In the second example, the existing first sensor is a camera 102 and the new second sensor is a LiDAR 202.

In the second specific example, image data is acquired by the camera 102 as the first surrounding environment data. The image data acquired by the camera 102 is stored in a storage device 112. In addition, point cloud data is acquired by the LiDAR 202 as the second surrounding environment data. The point cloud data acquired in the LiDAR 202 is stored in a storage device 212.

The system 10-2 comprises an object detector 122. The object detector 122 is a recognizer (first recognizer) using a deep learning model that is machine-learned to recognize a moving object from image data acquired by the camera 102. The image data stored in the storage device 112 is input into the object detector 122. The object detector 122 outputs a recognition result acquired by recognition processing on the image data. The recognition result includes a two-dimensional bounding box indicating the size of the recognized moving object and the object name of the recognized moving object. The recognized two-dimensional bounding box and the object name are stored in a storage device 132.

In the system 10-2, a coordinate transformer 142 is configured to transform data from the two-dimensional coordinate system of the camera 102 to the three-dimensional coordinate system of the LiDAR 202. The two-dimensional bounding box is input into the coordinate transformer 142 and transformed into a three-dimensional object. The result of calibration between the camera 102 and the LiDAR 202 is used for transformation of the coordinate system.

In the system 10-2, an annotator 222 reads point cloud data from the storage device 212 and projects the three-dimensional object and the object name acquired by the coordinate transformer 142 onto the point cloud data. The annotator 222 performs annotation while matching the time code of the point cloud data which is the projection destination with the time code of the data to be projected. The annotator 222 outputs tagged point cloud data acquired by the annotation. The tagged point cloud data is stored in a storage device 232.

A ground truth data generator 242 generates ground truth data for machine learning of an object detector 262 based on the tagged point cloud data. The object detector 262 is a recognizer (second recognizer) using a deep learning model. The object detector 262 is machine-learned to recognize a moving object from point cloud data acquired by the LiDAR 202. The ground truth data is stored in a storage device 252 in preparation for machine learning of the object detector 262.

Figure 6:
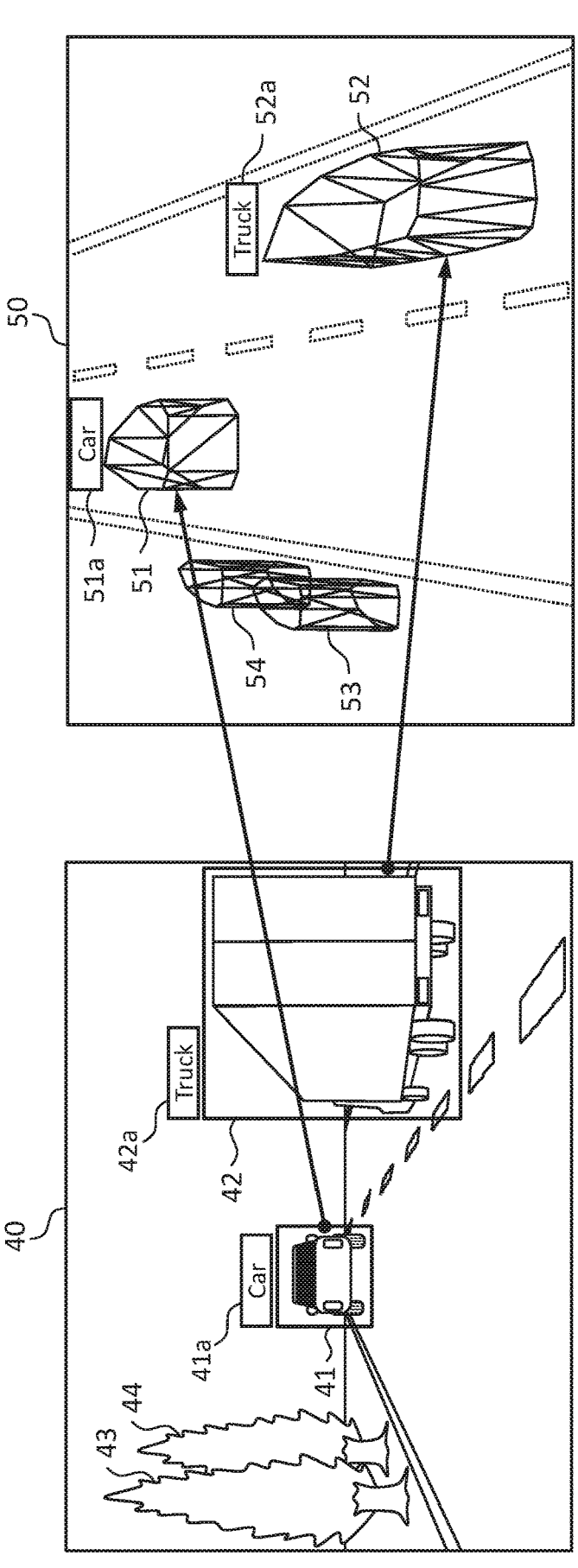
FIG. 6 is a schematic diagram showing automatic annotation process of the second specific example.

Here, automatic annotation processing by the system 10-2 will be specifically described with reference to FIG. 6. When image data 40 acquired by the camera 102 is input into the object detector 122, a moving object included in the image data 40 is represented by two-dimensional bounding boxes 41 and 42. Tags 41a and 42a indicating object names are attached to the two-dimensional bounding boxes 41 and 42, respectively. In the example shown in FIG. 6, the two-dimensional bounding box 41 represents a car and the two-dimensional bounding box 42 represents a truck.

Three dimensional convex hulls 51, 52, 53, and 54 indicating the contour shapes of objects are generated from the point cloud data 50 acquired by the LiDAR 202. When the three-dimensional object transformed from the two-dimensional bounding boxes 41 and 42 is projected onto the point cloud data 50, a convex hull 51 representing the contour shape of the car and a convex hull 52 representing the contour shape of the truck become apparent. A tag 51a is attached to the convex hull 51, and a tag 52a is attached to the convex hull 52. The convex hulls 53 and 54 respectively correspond to trees 43 and 44 in the image data 40, but the trees 43 and 44 which are stationary objects are not detected as moving objects by the object detector 122. Therefore, the convex hulls 53 and 54 are not tagged.

As described above, according to the system 10-2, it is possible to automatically perform annotation on the point cloud data 50 acquired by the new LiDAR 202 using the recognition result acquired by the object detector 122 for the existing camera 102. As a result, it is possible to easily generate the ground truth data for machine learning of the object detector 262 for the LiDAR 202.

1-2-3. Third Specific Example

Figure 7:
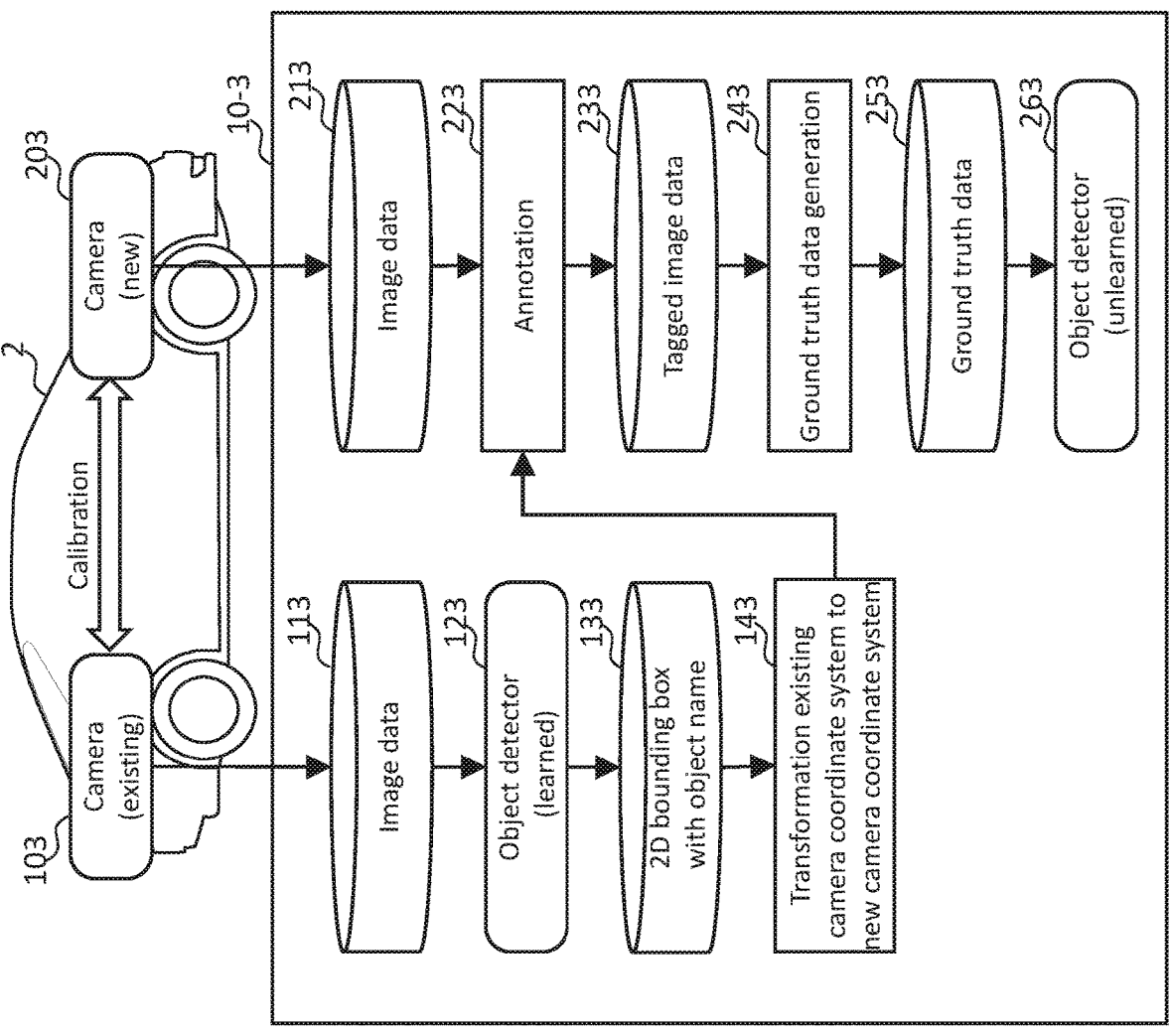
FIG. 7 is a diagram illustrating a first specific example of the system according to the first embodiment of the present disclosure.

FIG. 7 is a diagram showing a system 10-3 as the third specific example. The third specific example is an example in which the performance of a recognizer for a sensor having a certain modality is improved by using the recognition result of a sensor having the same modality. In the third specific example, the existing first sensor is a camera 103 and the new second sensor is also a camera 203.

In the third specific example, image data is acquired by the camera 103 as the first surrounding environment data. The image data acquired by the camera 103 is stored in a storage device 113. As the second surrounding environment data, image data is acquired by the camera 203. The image data acquired by the camera 203 is stored in a storage device 213.

The system 10-3 comprises an object detector 123. The object detector 123 is a recognizer (first recognizer) using a deep learning model that is machine-learned to recognize a moving object from image data acquired by the camera 103. The image data stored in the storage device 113 is input into the object detector 123. The object detector 123 outputs a recognition result acquired by recognition processing on the image data. The recognition result includes a two-dimensional bounding box indicating the size of the recognized moving object and the object name of the recognized moving object. The recognized two-dimensional bounding box and the object name are stored in the storage device 133.

In the system 10-3, a coordinate transformer 143 is configured to transform data from the two-dimensional coordinate system of the existing camera 103 to the two-dimensional coordinate system of the new camera 203. The two-dimensional bounding box is input into the coordinate transformer 143, and transformation such as translation, rotation, and enlargement/reduction is performed. The result of calibration between the existing camera 103 and the new camera 203 is used for the transformation of the coordinate system.

In the system 10-3, an annotator 223 reads image data from the storage device 213 and projects the two-dimensional bounding box and the object name acquired by the coordinate transformer 143 onto the image data. The annotator 223 performs annotation while matching the time code of the image data which is the projection destination with the time code of the data to be projected. The annotator 223 outputs tagged image data acquired by the annotation. The tagged image data is stored in a storage device 233.

A ground truth data generator 243 generates ground truth data for machine learning of an object detector 263 based on the tagged image data. The object detector 263 is a recognizer (second recognizer) using a deep learning model. The object detector 263 is machine-learned to recognize a moving object from the image data acquired by the camera 203. The ground truth data is stored in a storage device 253 in preparation for machine learning of the object detector 263.

Figure 8:
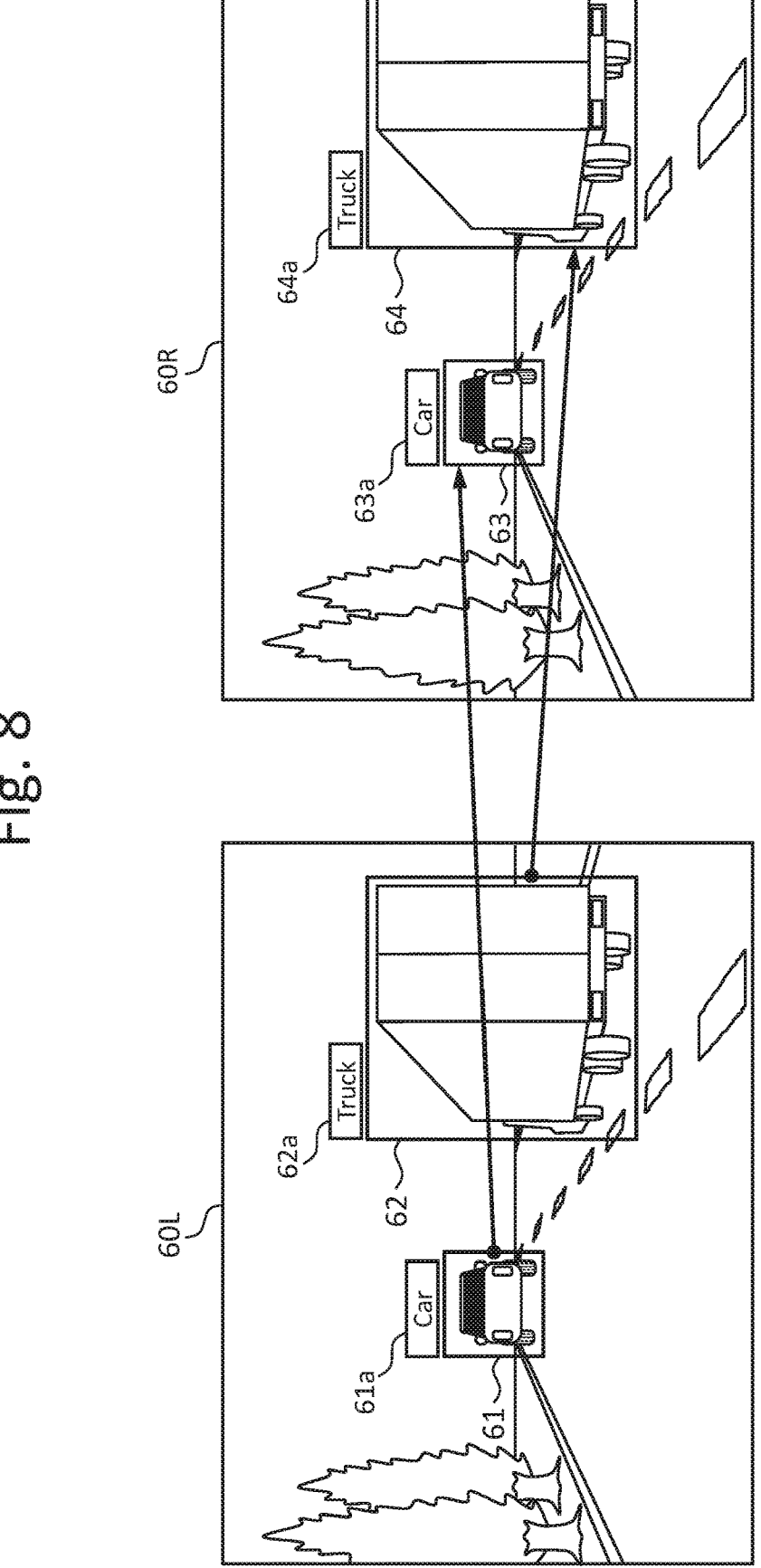
FIG. 8 is a schematic diagram showing automatic annotation processing according to the third specific example.

Here, automatic annotation processing by the system 10-3 will be specifically described with reference to FIG. 8. When image data 60L acquired by the camera 103 is input into the object detector 123, a moving object included in the image data 60L is represented by two-dimensional bounding boxes 41 and 42. Tags 61a and 62a indicating object names are attached to the two-dimensional bounding boxes 61 and 62, respectively. In the example shown in FIG. 8, the two-dimensional bounding box 61 represents a car and the two-dimensional bounding box 62 represents a truck.

The two-dimensional bounding boxes 61 and 62 are transformed into two-dimensional bounding boxes 63 and 64 by the coordinate transformer 143. The two-dimensional bounding boxes 63 and 64 are projected onto image data 60R acquired by the camera 203 together with the tags 63*a* and 64*a* indicating the object names. As a result, the car image in the image data 60R is surrounded by the two-dimensional bounding box 63 and tagged with the tag 63*a*, and the truck image is surrounded by the two-dimensional bounding box 64 and tagged with the tag 64*a*.

As described above, according to the system 10-3, it is possible to automatically perform annotation on the image data 60R acquired by the new camera 203 using the recognition result acquired by the object detector 123 for the existing camera 103. Accordingly, it is possible to easily generate the ground truth data for machine learning of the object detector 263 for the camera 203.

1-2-4. Fourth Specific Example

Figure 9:
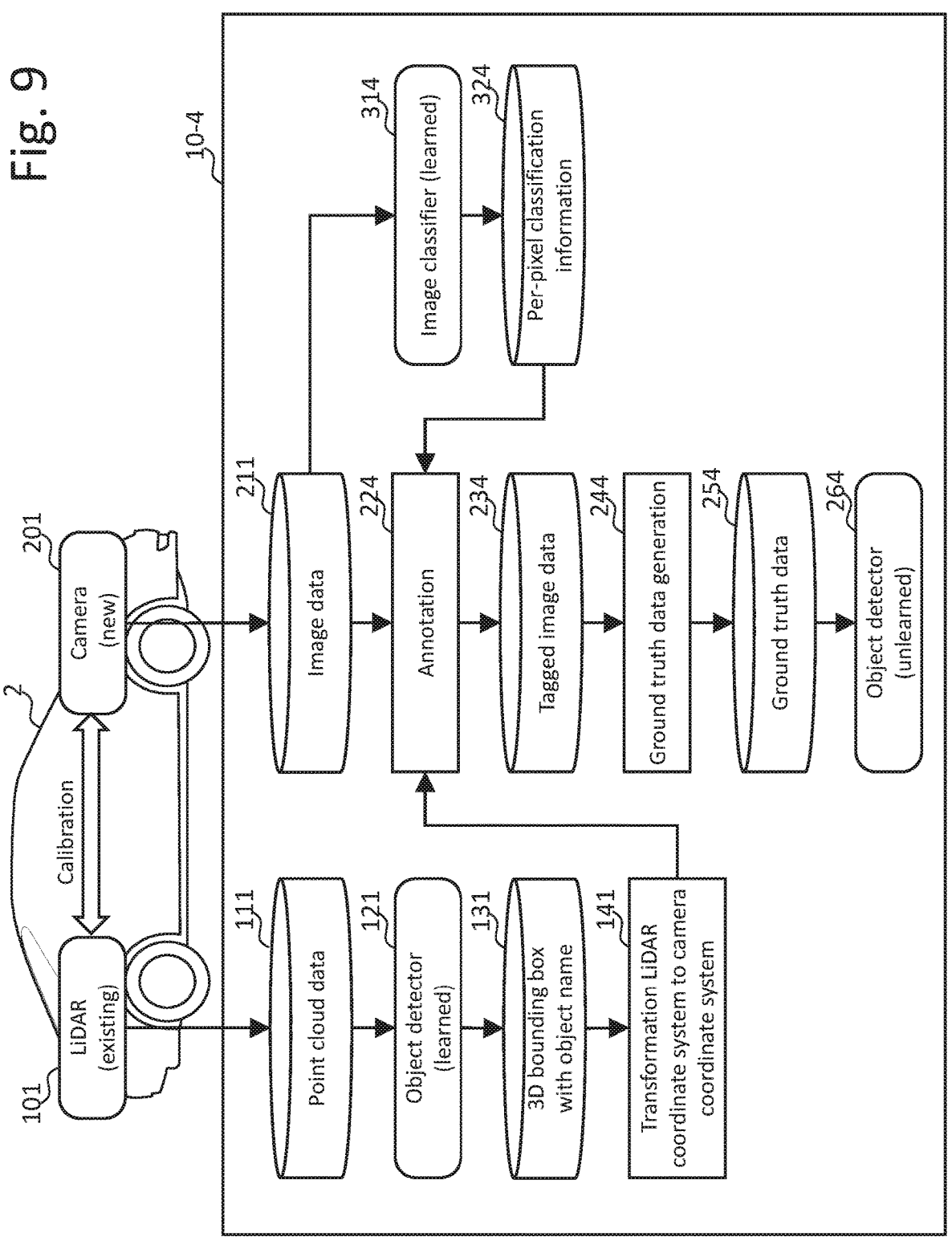
FIG. 9 is a diagram illustrating a fourth specific example of the system according to the first embodiment of the present disclosure.

FIG. 3 illustrates a system 10-4 as the fourth specific example. The system 10-4 is a modification of the system 10-1 of the first specific example. In FIG. 9, elements common to those of the system 10-1 are denoted by common reference numerals.

The system 10-4 comprises an image classifier 314. The image classifies 314 is a recognizer (third recognizer) using a deep learning model that is machine-learned to perform semantic segmentation on image data acquired by the camera 201. The image data stored in the storage device 211 is input to the image classifier 314. The image classifier 314 outputs per-pixel classification information as a recognition result (second recognition result). The classification information is stored in a storage device 324.

In the system 10-4, an annotator 224 reads image data from the storage device 211 and projects the classification information read from the storage device 324 onto the image data in addition to the two-dimensional bounding box and the object name acquired by the coordinate transformer 141. The annotator 224 performs annotation while matching the time code of the image data which is the projection destination with the time code of the data to be projected. The annotator 224 outputs tagged image data acquired by the annotation. The tagged image data is stored in a storage device 234.

A ground truth data generator 244 generates ground truth data for machine learning of an object detector 264 based on the tagged image data. The object detector 264 is a recognizer (second recognizer) using a deep learning model. The object detector 264 is machine-learned to recognize a moving object from the image data acquired by the camera 201. The ground truth data is stored in a storage device 254 in preparation for machine learning of the object detector 264.

Figure 10:
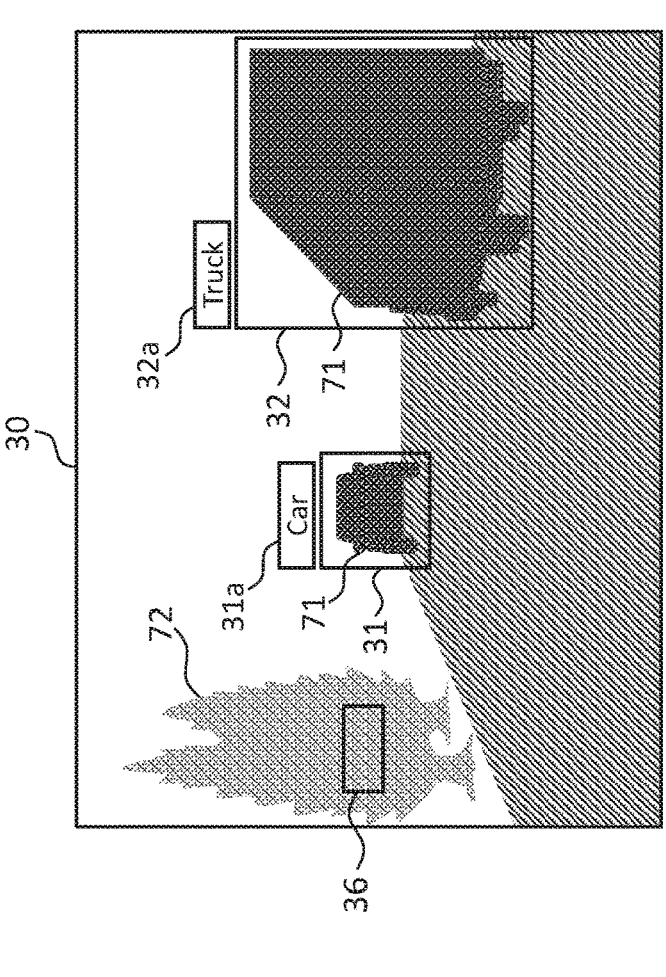
FIG. 10 is a schematic diagram showing automatic annotation processing according to the fourth specific example.
Figure 10:
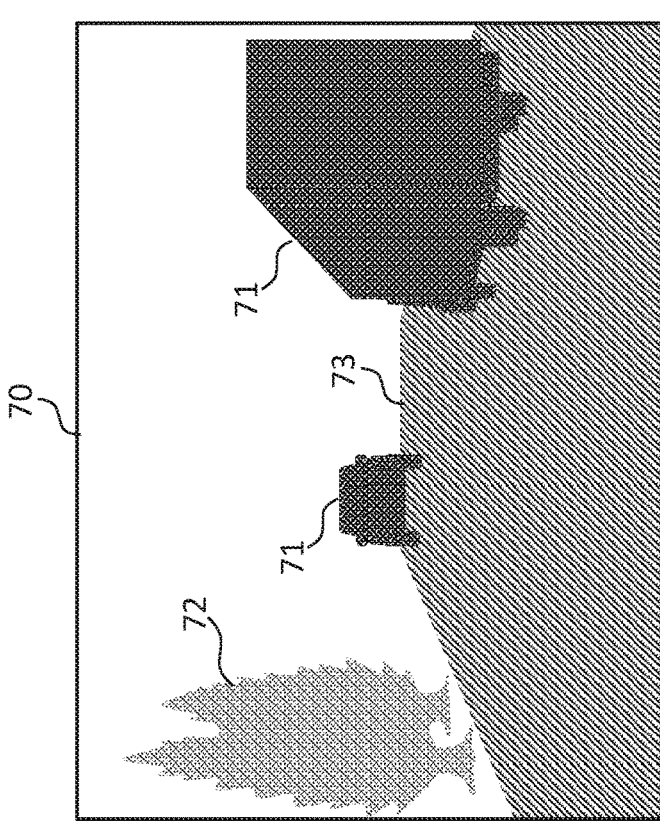

Here, automatic annotation processing by the system 10-4 will be specifically described with reference to FIG. 10. When image data acquired by the camera 201 is input into the image classifier 314, image data 70 classified by pixel is acquired. In the example shown in FIG. 10, the image data 70 is classified into a moving object 71, a stationary object 72, and a ground 73. The classification information acquired by the image classifier 314 is projected onto the image data 30.

Three two-dimensional bounding boxes 31, 32 and 36 are projected onto the image data 30. However, only the two-dimensional bounding boxes 31 and 32 are overlapped and projected with the classification information indicating the moving object 71. Classification information indicating the stationary object 72 is projected onto the two-dimensional bounding box 36. From this result, it can be seen that the two-dimensional bounding boxes 31 and 32 are surely determined to be moving objects, and the two-dimensional bounding box 36 is erroneously detected. The annotator 224 outputs tagged image data from which the two-dimensional bounding box 36 is removed.

As described above, in the system 10-4, in addition to the two-dimensional bounding box recognized from the output of the LiDAR 101, the classification information of the image data acquired by the image classifier 314 is projected to the image data. By projecting two different data in this way, the accuracy of the annotation can be further improved.

1-2-5. Fifth Specific Example

Figure 11:
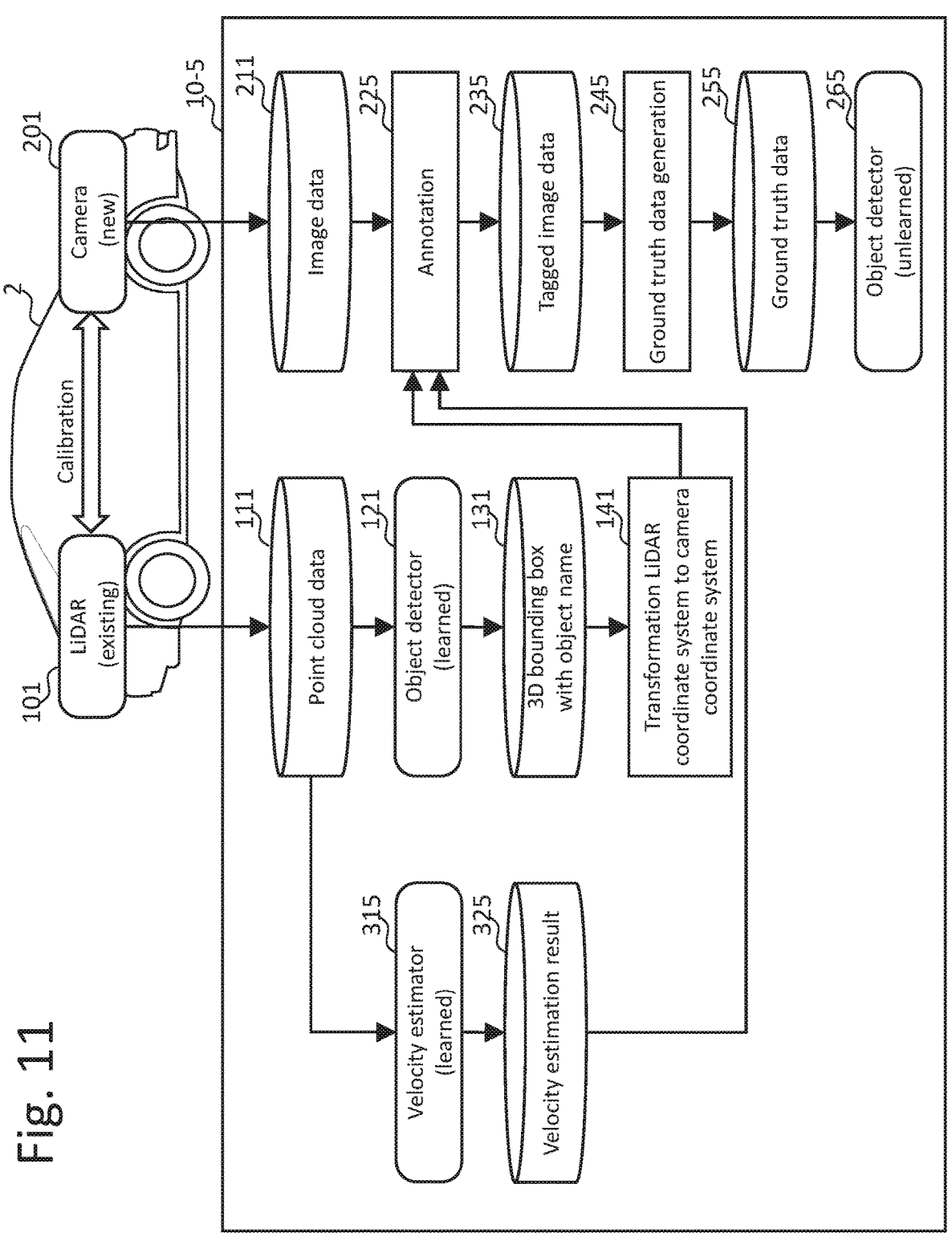
FIG. 11 is a diagram illustrating a fifth specific example of the system according to the first embodiment of the present disclosure.

FIG. 11 illustrates a system 10-5 as the fifth specific example. The system 10-5 is a modified example of the system 10-1 of the first specific example. In FIG. 11, elements common to those of the system 10-1 are denoted by common reference numerals.

The system 10-5 comprises a velocity estimator 315. The velocity estimator 315 is an estimator that estimates velocity of point cloud data acquired by the LiDAR 101 using a deep learning model. The point cloud data stored in the storage device 111 is input into the velocity estimator 315. The velocity estimator 315 outputs a velocity estimation result. The velocity estimation result is stored in a storage device 325.

In the system 10-5, an annotator 225 reads image data from the storage device 211, and projects the velocity estimation result read from the storage device 325 onto the image data in addition to the two-dimensional bounding box and the object name acquired by the coordinate transformer 141. The annotator 225 performs annotation while matching the time code of the image data which is the projection destination with the time code of the data to be projected. The annotator 225 outputs tagged image data acquired by the annotation. The tagged image data is stored in a storage device 235.

A ground truth data generator 245 generates ground truth data for machine learning of an object detector 265 based on the tagged image data. The object detector 265 is a recognizer (second recognizer) using a deep learning model. The object detector 265 is machine-learned to recognize a moving object from the image data acquired by the camera 201. The ground truth data is stored in a storage device 255 in preparation for machine learning of the object detector 265.

Figure 12:
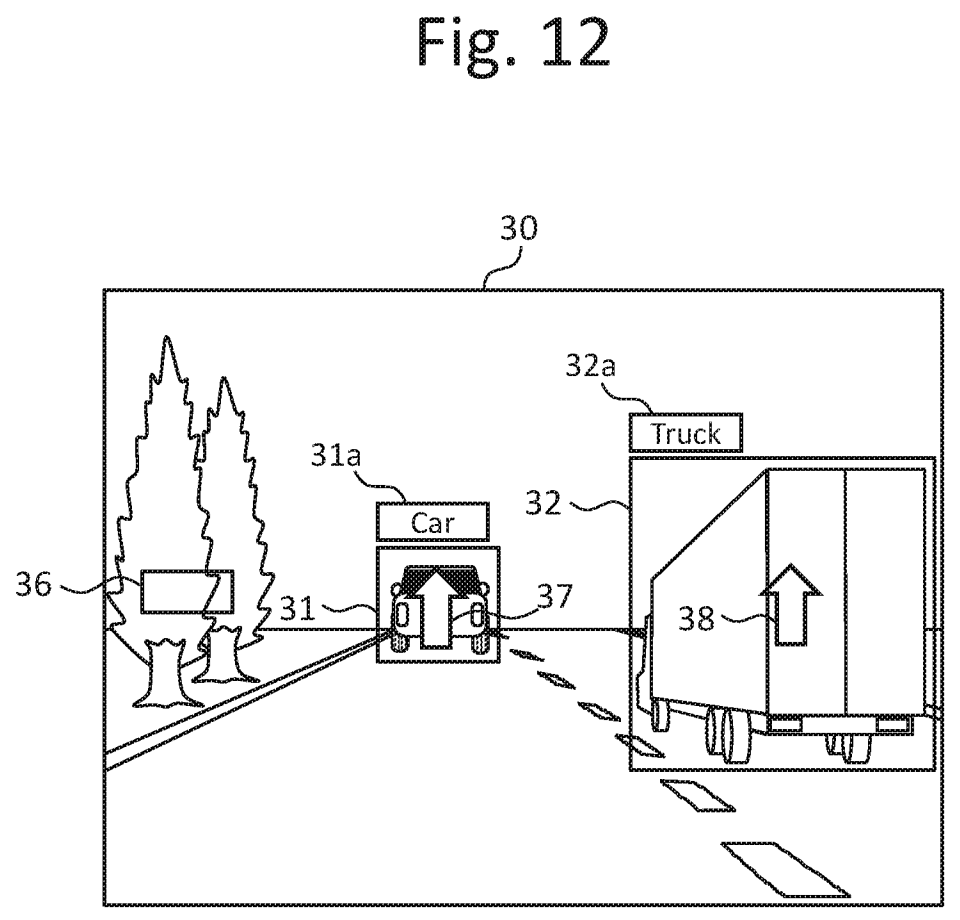

Here, automatic annotation processing by the system 10-5 will be specifically described with reference to FIG. 12. The point cloud data acquired by the LiDAR 101 is input to the velocity estimator 315 to acquire a velocity estimation result. The velocity estimation result is represented by velocity vectors 37 and 38 and projected onto the image data 30.

Three two-dimensional bounding boxes 31, 32 and 36 are projected onto the image data 30. However, only the two-dimensional bounding boxes 31 and 32 are overlapped and projected with the velocity vectors 37 and 38. No velocity vector is projected onto the two-dimensional bounding box 36. From this result, it can be seen that the two-dimensional bounding boxes 31 and 32 are surely determined to be moving objects, and the two-dimensional bounding box 36 is erroneously detected. The annotator 225 outputs tagged image data from which the two-dimensional bounding box 36 is removed.

As described above, in the system 10-5, in addition to the two-dimensional bounding box recognized from the output of the LiDAR 101, the velocity estimation result acquired by the velocity estimator 315 is projected to the image data. By projecting different data in this way, the accuracy of annotation can be further improved.

1-2-6. Sixth Specific Example

Figure 13:
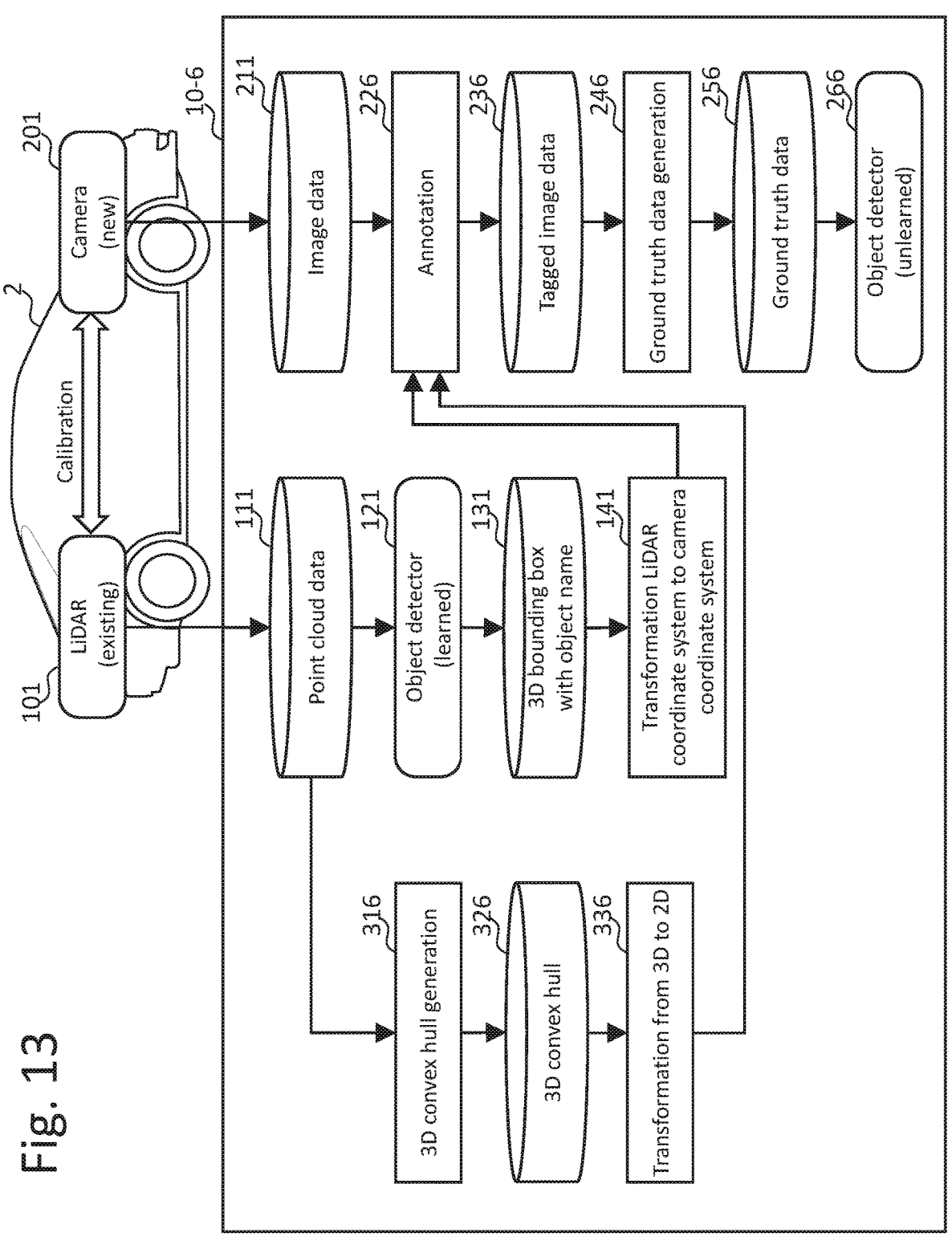
FIG. 13 is a diagram illustrating a sixth specific example of the system according to the first embodiment of the present disclosure.

FIG. 13 illustrates a system 10-6 as the sixth specific example. The system 10-6 is a modified example of the system 10-1 of the first specific example. In FIG. 13, elements common to those of the system 10-1 are denoted by common reference numerals.

The system 10-6 comprises a three-dimensional convex hull generator 316. The three-dimensional convex hull generator 316 extracts the contour shape of an object from the point cloud data acquired by the LiDAR 101. The extracted contour shape of the object is represented by a three-dimensional convex hull. The point cloud data stored in the storage device 111 is input into the three-dimensional convex hull generator 316. The three-dimensional convex hull output from the three-dimensional convex hull generator 316 is stored in a storage device 326.

The system 10-6 comprises a coordinate transformer 336. The coordinate transformer 336 is configured to project the three-dimensional convex hull onto a plane to transform it into a two-dimensional convex hull. The plane on which the three-dimensional convex hull is projected is a plane established by the camera 201. The result of calibration between the LiDAR 101 and the camera 201 is used for transformation from the three-dimensional convex hull to the two-dimensional convex hull.

In the system 10-6, an annotator 226 reads image data from the storage device 211 and projects the two-dimensional convex hull acquired by the coordinate transformer 336 onto the image data in addition to the two-dimensional bounding box and the object name acquired by the coordinate system transformer 141. The annotator 226 performs annotation while matching the time code of the image data which is the projection destination with the time code of the data to be projected. The annotator 226 outputs tagged image data acquired by the annotation. The tagged image data is stored in a storage device 236.

A ground truth data generator 246 generates ground truth data for machine learning of an object detector 266 based on the tagged image data. The object detector 266 is a recognizer (second recognizer) using a deep learning model. The object detector 266 is machine-learned to recognize a moving object from the image data acquired by the camera 201. The ground truth data is stored in a storage device 256 in preparation for machine learning of the object detector 266.

Figure 14:
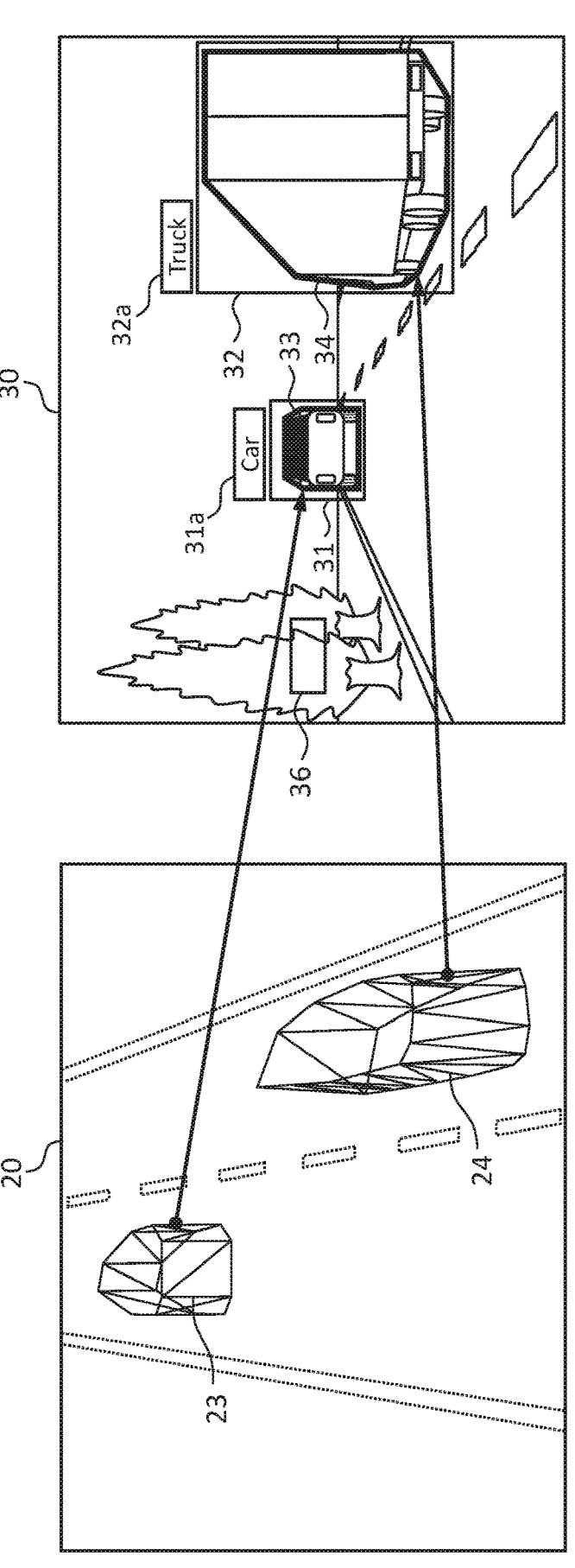
FIG. 14 is a schematic diagram showing automatic annotation processing of the sixth specific example.

Here, automatic annotation processing by the system 10-6 will be specifically described with reference to FIG. 14. The point cloud data 20 acquired by the LiDAR 101 is input into the three-dimensional convex hull generator 316 to acquire three-dimensional convex hulls 23 and 24. The three-dimensional convex hulls 23, 24 are transformed into two-dimensional convex hulls 33 and 34 by the coordinate transformer 336, and the two-dimensional convex hulls 33 and 34 are projected onto the image data 30.

Three two-dimensional bounding boxes 31, 32 and 36 are projected onto the image data 30. However, only the two-dimensional bounding boxes 31 and 32 are overlapped and projected with the two-dimensional convex hulls 33 and 34. No two-dimensional convex hull is projected onto the two-dimensional bounding box 36. From this result, it can be seen that the two-dimensional bounding boxes 31 and 32 are surely determined to be moving objects, and the two-dimensional bounding box 36 is erroneously detected. The annotator 226 outputs tagged image data from which the two-dimensional bounding box 36 is removed.

As described above, in the system 10-6, in addition to the two-dimensional bounding box recognized from the output of the LiDAR 101, the two-dimensional convex hull acquired from the point cloud data is projected to the image data. By projecting different data in this way, the accuracy of annotation can be further improved.

1-2-7. Seventh Specific Example

Figure 15:
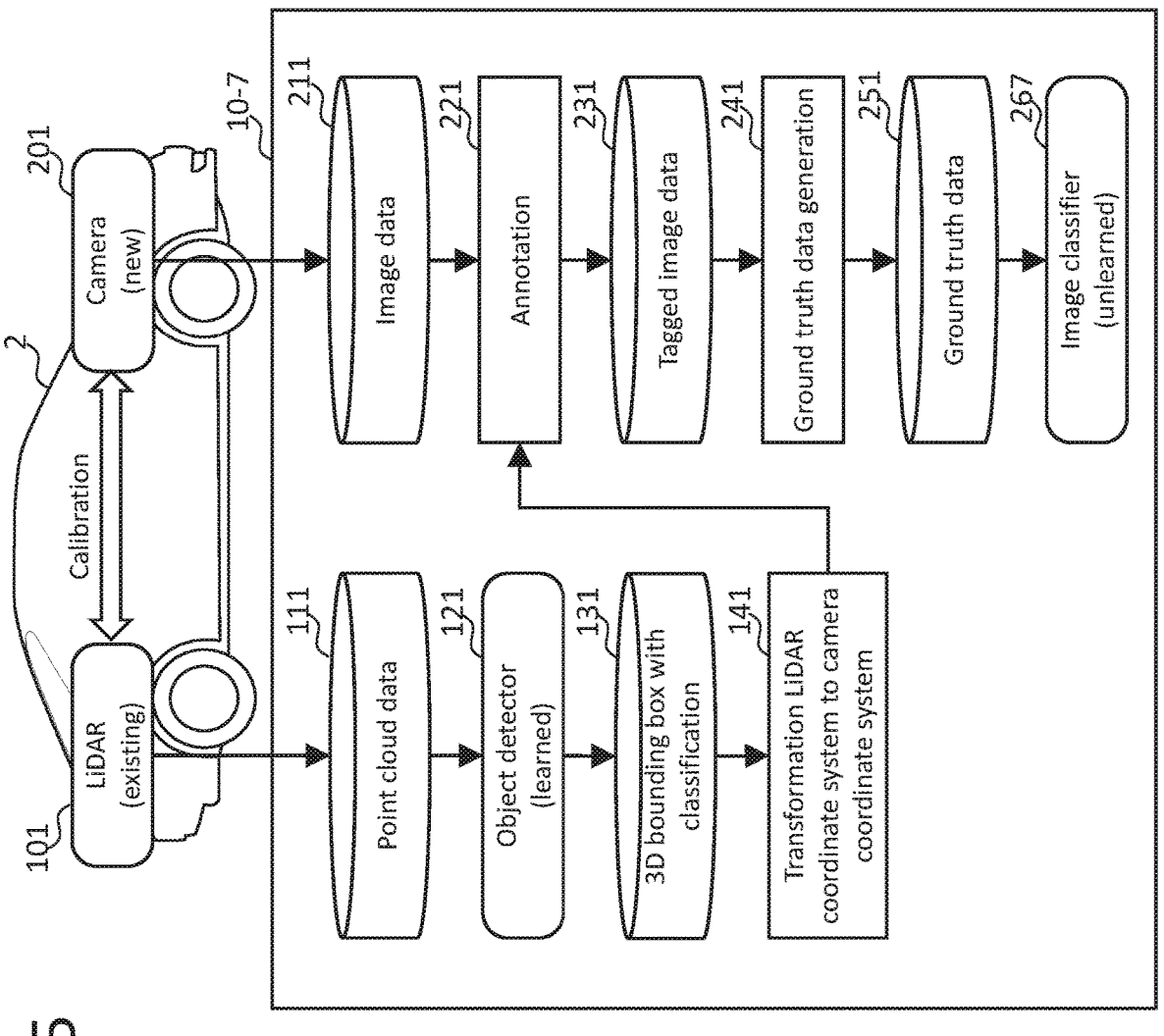
FIG. 15 is a diagram illustrating a seventh specific example of the system according to the first embodiment of the present disclosure.

FIG. 15 illustrates a system 10-7 as the seventh specific example. The seventh specific example is an example in which a recognizer that needs to be relearned due to replacement of the second sensor is an image classifier. The system 10-7 can be described as a modified example of the system 10-1 of the first specific example. In FIG. 15, elements common to those of the system 10-1 are denoted by common reference numerals.

In the system 10-7, ground truth data for machine learning an image classifier 267 is generated. The image classifier 267 is a recognizer (second recognizer) using a deep learning model. The image classifier 267 is machine-learned to perform semantic segmentation on the image data acquired by the camera 201. The method of generating ground truth data is common to that of the system 10-1. Therefore, the system 10-7 corresponds to the system 10-1 in which the object detector 261 is replaced with the image classifier 267.

2. Second Embodiment

Figure 16:
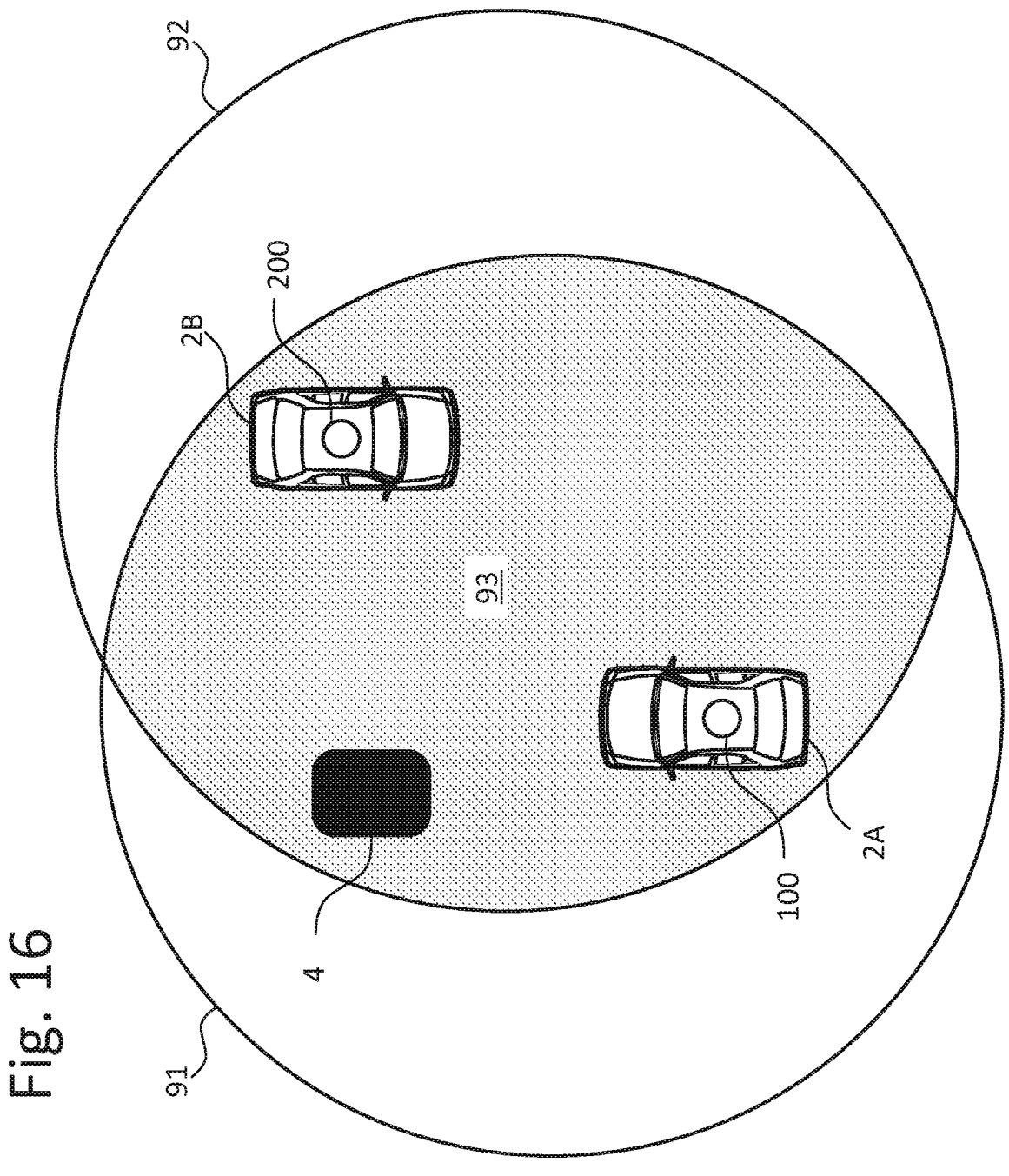
FIG. 16 is a diagram illustrating an outline of a second embodiment of the present disclosure.

FIG. 16 is a diagram illustrating an outline of a second embodiment of the present disclosure. A first vehicle 2A and a second vehicle 2B shown in FIG. 16 are autonomous driving vehicles. A first sensor 100 and a first recognizer corresponding to the first sensor 100 are mounted in the first vehicle 2A. A second sensor 200 and a second recognizer corresponding to the second sensor 200 are mounted in the second vehicle 2B.

When the second sensor 200 is replaced with a new sensor in the second vehicle 2B, it is necessary to perform machine learning of the second recognizer to match the new second sensor 200. In order to generate ground truth data required for the machine learning, in the method according to the second embodiment, surrounding environment data acquired by the first sensor 100 mounted on the first vehicular 2A is used for annotation.

As illustrated in FIG. 16, when the first vehicle 2A and the second vehicle 2B approach each other, an overlap region 93 is generated between a region 91 recognized by the first sensor 100 of the first vehicle 2A and a region 92 recognized by the second sensor 200 of the second vehicle 2B. A moving object 4 present in the overlap region 93 is included in surrounding environment data (first surrounding environment data) acquired by the first sensor 100 and is also included in surrounding environment data (second surrounding environment data) acquired by the second sensor 200.

In the method according to the second embodiment, when the overlap region 93 occurs, the first surrounding environmental data is acquired by the first sensor 100 in the first vehicle 2A, and the second surrounding environmental data is acquired by the second sensor 200 in the second vehicle 2B. The first surrounding environment data acquired by the first sensor 100 is input to the first recognizer to acquire a recognition result by the first sensor 100. The recognition result by the first sensor 100 is projected to the second surrounding environment data by transformation from the coordinate system of the first sensor 100 to the coordinate system of the second sensor 200.

In the coordinate transformation of the recognition result by the first sensor 100, the position and the posture of each of the vehicles 2A and 2B on the global coordinate system at the time of data acquisition are referred to. In the method according to the second embodiment, the position and the posture of each of the vehicles 2A and 2B on the global coordinate system are measured using a GPS and an IMU. The position and the posture on the global coordinate system measured in the first vehicle 2A are associated with the first surrounding environment data acquired by the first sensor 100 together with the time code. The position and the posture on the global coordinate system measured in the second vehicle 2B are associated with the second surrounding environment data acquired by the second sensor 200 together with the time code.

The system for implementing the method according to the first embodiment and specific examples thereof can also be applied to the method according to the second embodiment.

3. Other Embodiments

Although a camera and a LiDAR are exemplified as the first sensor and the second sensor in the embodiment described above, at least one of the first sensor and the second sensor may be a radar. A radar is a sensor with a different modality than a camera and a LiDAR. For example, when the first sensor is a radar, the second sensor may be a camera or a LiDAR. When the first sensor is a camera or a LiDAR, the second sensor may be a radar.

What is claimed is:

1. A method comprising:
acquiring first surrounding environment data by a first sensor;
acquiring second surrounding environment data by a second sensor at a same time as an acquisition time of the first surrounding environment data and in a same region as an acquisition region of the first surrounding environment data;
acquiring a first recognition result by inputting the first surrounding environment data into a first recognizer machine-learned using surrounding environment data acquired by the first sensor;
projecting the first recognition result onto the second surrounding environment data by transformation from a coordinate system of the first sensor to a coordinate system of the second sensor;
generating ground truth data for machine-learning a second recognizer configured to recognize surrounding environment data acquired by the second sensor, based on the second surrounding environment data onto which the first recognition result is projected;
inputting the second surrounding environment data into a third recognizer machine-learned using surrounding environment data acquired by the second sensor to acquire a second recognition result; and
further projecting the second recognition result onto the second surrounding environment data onto which the first recognition result is projected,

wherein the generating the ground truth data comprises generating the ground truth data based on the second surrounding environment data onto which the first recognition result and the second recognition result are projected.

2. The method according to claim 1, wherein the second sensor is a camera, the third recognizer is an image classifier configured to perform semantic segmentation, and the second recognition result is represented by per-pixel classification information.

3. A method comprising:
acquiring first surrounding environment data by a first sensor, wherein the first sensor is a LiDAR;
acquiring second surrounding environment data by a second sensor at a same time as an acquisition time of the first surrounding environment data and in a same region as an acquisition region of the first surrounding environment data;
acquiring a first recognition result by inputting the first surrounding environment data into a first recognizer machine-learned using surrounding environment data acquired by the first sensor;
projecting the first recognition result onto the second surrounding environment data by transformation from a coordinate system of the first sensor to a coordinate system of the second sensor;
generating ground truth data for machine-learning a second recognizer configured to recognize surrounding environment data acquired by the second sensor, based on the second surrounding environment data onto which the first recognition result is projected;
inputting the first surrounding environment data into a velocity estimator configured to estimate velocity of point cloud data acquired by the first sensor to acquire a velocity estimation result; and
further projecting the velocity estimation result onto the second surrounding environment data onto which the first recognition result is projected,
wherein the generating the ground truth data comprises generating the ground truth data based on the second surrounding environment data onto which the first recognition result and the velocity estimation result are projected.

4. A method comprising:
acquiring first surrounding environment data by a first sensor, wherein the first sensor is a LiDAR;
acquiring second surrounding environment data by a second sensor at a same time as an acquisition time of the first surrounding environment data and in a same region as an acquisition region of the first surrounding environment data;
acquiring a first recognition result by inputting the first surrounding environment data into a first recognizer machine-learned using surrounding environment data acquired by the first sensor;
projecting the first recognition result onto the second surrounding environment data by transformation from a coordinate system of the first sensor to a coordinate system of the second sensor;
generating ground truth data for machine-learning a second recognizer configured to recognize surrounding environment data acquired by the second sensor, based on the second surrounding environment data onto which the first recognition result is projected;
extracting a contour shape of an object from point cloud data acquired by the first sensor; and further projecting the contour shape onto the second surrounding environment data onto which the first recognition result is projected, wherein the generating the ground truth data comprises generating the ground truth data based on the second surrounding environment data onto which the first recognition result and the contour shape are projected.

\* \* \* \* \*